UNITED STATES PATENT OFFICE.

HAROLD ST. JOHN WALTON, OF FEILDING, NEW ZEALAND.

SUBSOIL-DRAINING ATTACHMENT TO AGRICULTURAL IMPLEMENTS.

1,373,374.  Specification of Letters Patent.  Patented Mar. 29, 1921.

Application filed May 9, 1918. Serial No. 233,598.

*To all whom it may concern:*

Be it known that I, HAROLD ST. JOHN WALTON, subject of the King of Great Britain, residing at Feilding, in the Dominion of New Zealand, have invented a new and useful Improvement in Subsoil-Draining Attachments to Agricultural Implements; and I do hereby declare the following to be a full, clear, and exact description of the same.

This invention relates to improvements in that known class of means for forming drains beneath the surface of plowed land in which the drain is formed by the employment of special attachments to a plow harrow or other implement, consisting in a knife blade that is fixed to extend more or less in a vertical line with the frame of such implement, and a round core or mandrel that is connected to the lower end of such knife. In use, the knife blade enters the ground and is drawn along through it so that the core or mandrel attached to its rear is drawn after it, and by its passage through the ground, forms the required drain.

The present improvements have been devised with the object of facilitating the passage of the core or mandrel through the ground and thereby to lessen the draft required or the strain on the horses.

The improvements consist in forming the mandrel with a screw front end and in attaching it to the knife blade in such a manner that it will be free to rotate on its own axis, so that it will thus bore its way through the ground. Clearance for the said connection between the mandrel and knife blade and also an entry for the screw end of the mandrel, is obtained by means of a knob projecting from the front edge of the knife blade in a line with such connection.

The invention is illustrated in the accompanying drawings, in which:—

The mandrel is constructed with its back portion A of conical form and with its forward portion B of screw or auger form, the diameter of such portion B tapering to a point so that the edge of the screw conforms to the tapered surface of the back portion. Consequently the mandrel, when drawn along through the soil, will, by reason of its auger point, bore its way readily through the soil and then by its tapering back end enlarge the bore and pack its sides firmly so that the drain will remain open.

To permit of the mandrel rotating when attached to the knife blade, the connecting chain C linked to its point is provided with the swivel shackle D in its length.

Figure 1:
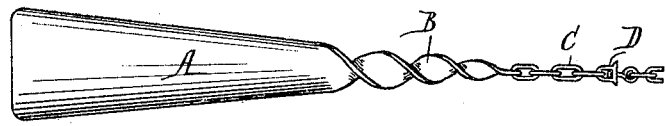
Figure 1 is a side elevation of the improved mandrel and its chain connection for attachment to the knife blade.
Figure 2:
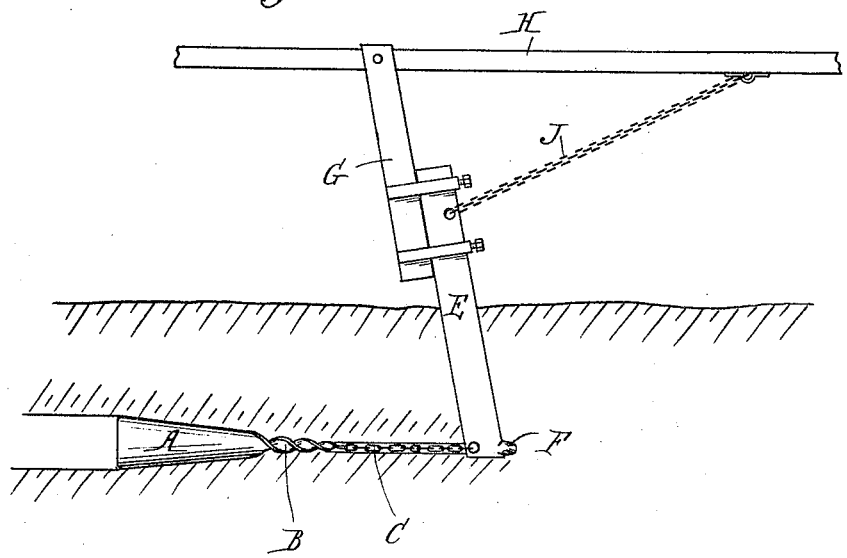
Fig. 2 is a view showing the mandrel, on a smaller scale, attached to the knife blade and in its working position.

E (Fig. 2) is the knife blade which is adapted to enter and slice through the ground in the usual way and to the back end of which the mandrel is attached by means of the chain C. This knife blade, in this invention, is formed with the knob or plug F projecting from its forward edge in a horizontal line with the chain and mandrel, such knob or plug being made of such a diameter as to form the necessary clearance through the soil for the free passage of the chain C and at the same time to make an entry for the forward end of the mandrel. Thus the passage of the mandrel through the soil will be facilitated.

The knife blade is attached in any suitable manner to the machine frame, as for instance by being fastened to an arm or stalk G fixed to the beam H of the machine. It is then stayed by means of the chain or rod J extending from its front end upwardly and forwardly to the beam and therefore serving to hold the knife blade up to its work.

I claim:—

1. A drain forming attachment for agricultural implements, comprising a rotatable mandrel having a conical rear portion and an auger-shaped forward portion; the latter portion tapering from a point at the front end thereof in conformity with the taper of the conical rear portion, whereby, when the mandrel is drawn along, its auger point will bore its way through the soil and its tapering rear portion will enlarge the bore and pack its sides firmly so that the bore will remain open.

2. A drain forming attachment for agricultural implements, comprising a rotatable mandrel having a conical rear portion and an auger-shaped forward portion, a knife blade fastened to and extending downward from the implement, a chain connected at opposite ends to the front end of the auger-shaped portion of the mandrel and the lower end of the knife blade, and a swivel incorporated in the chain to permit rotation of the mandrel about its axis when drawn along; the said auger-shaped portion of the mandrel tapering from a point at the front end thereof in conformity with the taper of the conical rear portion, whereby, when the mandrel is drawn along, its auger point will bore its way through the soil and its tapering rear portion will enlarge the bore and pack its sides firmly so that the bore will remain open.

3. A drain forming attachment for agricultural implements, comprising a rotatable mandrel having a conical rear portion and an auger-shaped forward portion, a knife blade fastened to and extending downward from the implement and provided adjacent its lower end with a forwardly-projecting knob, a chain connected at opposite ends to the front end of the auger-shaped portion of the mandrel and the lower end of the knife blade and disposed in a horizonal line with said knob, and a swivel incorporated in the chain to permit rotation of the mandrel about its axis when drawn along; the said auger-shaped portion of the mandrel tapering from a point at the front end thereof in conformity with the taper of the conical rear portion, whereby, when the mandrel is drawn along, its auger point will bore its way through the soil and its tapering rear portion will enlarge the bore and pack its sides firmly so that the bore will remain open.

In testimony whereof I have signed this specification in the presence of two subscribing witnesses.

HAROLD ST. JOHN WALTON.

Witnesses:
I. M. BODDY,
F. KELLY.